United States Patent [19]
Sumiya et al.

[11] Patent Number: 4,727,773
[45] Date of Patent: Mar. 1, 1988

[54] HYDRAULIC CIRCUIT FOR CONTROLLING AUTOMATIC TRANSMISSION

[75] Inventors: Koji Sumiya, Nishio; Yoshikazu Sakaguchi, Anjo; Takuji Taniguchi, Okazaki; Yutaka Taga, Aichi; Yoshio Shindo, Toyota, all of Japan

[73] Assignees: Aisin-Warner Kabushiki Kaisha; Toyota Jidosha Kabushiki Kaisha, both of Aichi, Japan

[21] Appl. No.: 846,044

[22] Filed: Mar. 31, 1986

[30] Foreign Application Priority Data

Jul. 31, 1985 [JP] Japan .................. 60-169191
Jul. 31, 1985 [JP] Japan .................. 60-169192
Feb. 8, 1986 [JP] Japan .................. 61-26449

[51] Int. Cl.$^4$ .................. B60K 41/22; B60K 41/28
[52] U.S. Cl. .................. 74/867; 74/869; 74/866; 74/752 A; 192/12 R; 192/13 R
[58] Field of Search .................. 74/866, 867, 868, 869, 74/752 A; 192/12 R, 13 R, 101; 188/216

[56] References Cited

U.S. PATENT DOCUMENTS

| | | | |
|---|---|---|---|
| 3,752,011 | 8/1973 | Casey et al. | 74/866 |
| 3,956,947 | 5/1976 | Leising et al. | 74/866 |
| 4,021,712 | 5/1977 | Ishihara et al. | 74/866 |
| 4,324,321 | 4/1982 | Ushijima et al. | 192/13 R |
| 4,360,092 | 11/1982 | Muller et al. | 192/13 R |
| 4,367,528 | 1/1983 | Kawamoto et al. | 74/866 |
| 4,497,222 | 2/1985 | Nagaoka et al. | 74/869 |
| 4,527,678 | 7/1985 | Pierce et al. | 74/866 |

FOREIGN PATENT DOCUMENTS

| | | | |
|---|---|---|---|
| 123041 | 9/1980 | Japan | 74/869 |
| 37140 | 3/1982 | Japan | . |
| 183147 | 10/1984 | Japan | . |
| 231059 | 11/1985 | Japan | 74/866 |
| 237256 | 11/1985 | Japan | 74/866 |

Primary Examiner—Rodney H. Bonck
Assistant Examiner—David A. Testardi
Attorney, Agent, or Firm—Wenderoth, Lind & Ponack

[57] ABSTRACT

A hydraulic circuit for controlling an automatic transmission. The hydraulic circuit has a control valve connected between a shift valve and a hydraulic servomotor for actuating a frictional engagement element such as a brake in a main transmission unit. The control valve is controlled by a signal from a control means in such a manner that, when the hydraulic servomotor is drained by the operation of the shift valve to disengage the brake, the engagement of a frictional engaging element in another transmission unit is synchronized therewith.

10 Claims, 18 Drawing Figures

FIG. 8

| position | | solenoid valve | | | | | clutch | | | brake | | | | OWC | | |
|---|---|---|---|---|---|---|---|---|---|---|---|---|---|---|---|---|
| | | $S_1$ | $S_2$ | $S_3$ | $S_L$ | $S_D$ | $C_0$ | $C_1$ | $C_2$ | $B_0$ | $B_1$ | $B_2$ | $B_3$ | $F_0$ | $F_1$ | $F_2$ |
| P | | × | ○ | × | × | × | ○ | × | × | × | × | × | × | × | × | × |
| R | | × | ○ | × | × | × | ○ | × | ○ | × | × | × | ○ | ○ | × | × |
| N | | × | ○ | × | × | × | ○ | × | × | × | × | × | × | × | × | × |
| D | 1st | × | ○ | × | × | × | ○ | ○ | × | × | × | × | × | ○ | × | ⊗ |
| | 2nd | × | ○ | ○ | ◎ | ※ | × | ○ | × | ○ | × | × | × | × | × | ⊗ |
| | 3rd | ○ | ○ | × | ◎ | ※ | ○ | ○ | × | × | × | ○ | × | ○ | ⊗ | × |
| | 4th | ○ | ○ | ○ | ◎ | × | ○ | ○ | × | × | ○ | ○ | × | × | ⊗ | × |
| | 5th | ○ | × | × | ◎ | × | × | ○ | ○ | × | × | ○ | × | ○ | × | × |
| | 6th | ○ | × | ○ | ◎ | × | × | ○ | ○ | × | ○ | ○ | × | × | × | × |
| | (5th) | × | × | × | × | × | ○ | ○ | ○ | × | × | ○ | × | ○ | × | × |
| S | 1st | × | ○ | × | × | × | ○ | ○ | × | × | × | × | × | ○ | × | ⊗ |
| | 2nd | × | ○ | ○ | ◎ | ※ | × | ○ | × | ○ | × | × | × | × | × | ⊗ |
| | 3rd | ○ | ○ | × | ◎ | ※ | ○ | ○ | × | × | ○ | ○ | × | ○ | ○ | × |
| | 4th | ○ | ○ | ○ | ◎ | × | ○ | ○ | × | × | ○ | ○ | × | × | ○ | × |
| | 5th | ○ | × | × | ◎ | × | × | ○ | ○ | × | × | ○ | × | ○ | × | × |
| | 6th | ○ | × | ○ | ◎ | × | × | ○ | ○ | ○ | × | ○ | × | × | × | × |
| | (5th) | × | × | × | × | × | ○ | ○ | ○ | × | × | ○ | × | ○ | × | × |
| L | 1st | × | ○ | × | × | × | ○ | ○ | × | × | × | × | ○ | ○ | × | × |
| | 2nd | × | ○ | ○ | ◎ | ※ | × | ○ | × | ○ | × | × | ○ | × | × | ○ |
| | 3rd | ○ | ○ | × | ◎ | ※ | ○ | ○ | × | × | ○ | ○ | × | ○ | ○ | × |
| | 4th | ○ | ○ | ○ | ◎ | × | ○ | ○ | × | × | ○ | ○ | × | × | ○ | × |
| | (1st) | × | × | × | × | × | ○ | ○ | × | × | × | × | ○ | ○ | × | ○ |

| note | | | |
|---|---|---|---|
| ○ | ON | engaged | locked |
| × | OFF | released | free |
| ◎ | ON L-UP ON / OFF L-UP OFF | — | — |
| ⊗ | — | — | free when coasting |
| ※ | actuated when sifting 2→3 | | |

2nd

3rd

6th

R

# 4,727,773

HYDRAULIC CIRCUIT FOR CONTROLLING AUTOMATIC TRANSMISSION

BACKGROUND OF THE INVENTION

1. Field of The Invention

The present invention broadly relates to an automotive automatic transmission, particularly to a controlling hydraulic circuit suitable for use in a multi-speed automatic transmission which is comprised of a main transmission unit and a sub-transmission unit. More particularly, the invention is drawn to a drain control arrangement for hydraulic servomotors which actuate various frictional engagement elements incorporated in the controlling hydraulic circuit.

2. Description of the Related Art

Generally, an automatic transmission has a torque converter and a planetary speed changing gear mechanism. The planetary speed changing gear mechanism is comprised mainly of an overdrive (O/D) planetary gear unit, a front planetary gear unit and a rear planetary gear unit. The planetary speed changing gear mechanism performs, by engaging or retaining a predetermined element by a clutch or a brake (frictional engagement elements) under the control of two solenoid valves and three shift valves, a speed change over four forward speeds and one reverse speed.

The frictional engagement elements are usually operated by hydraulic servomotors which are supplied with hydraulic pressure or which are drained in accordance with the states of the shift valves. Usually, each of such hydraulic servomotors is associated with an accummulator connected in parallel therewith, so that the servo pressure of the servomotor, i.e. the engaging-/disengaging characteristic of the frictional engagement element, is determined by the hydraulic pressure characteristics of the accummulator. Particularly, the draining characteristics of the accummulator directly affect the releasing characteristics of the servomotor.

Hitherto, however, the hydraulic pressure characteristics of the accummulator have been fixed, so that the releasing characteristics of the servomotor and, hence, of the frictional engagement element could not be controlled in accordance with factors such as the vehicle speed, timing of engagement of another frictional engagement element, and so forth.

In recent years, multi-speed automatic transmissions have been proposed in which a plurality of speeds are obtained by complicated control of engagement and disengagement of various clutches and brakes. Such automatic transmissions encounter a problem in that a large impact tends to be generated when the speed is changed, due to the draining characteristics of the accummulators having the aforementioned predetermined hydraulic pressure characteristics.

This problem will be described in more detail with reference to a multi-speed automatic transmission proposed in Japanese Patent Laid-Open No. 37140/1982, in which six speeds are attained by the combination of a sub-transmission unit which has two speeds, i.e. overdrive speed and direct-coupling speed, and a main transmission unit which can select one of three speed gears, i.e. a 1st speed gear, a 2nd speed gear and a 3rd speed gear. In some cases, this automatic transmission is required to effect simultaneously both an upshift in one of the main and sub-transmission units and a downshift in the other. For instance, upshift of the automatic transmission as a whole from second to third speed is attained by effecting simultaneously both a downshift of the sub-transmission unit from the overdrive speed to the direct-coupling speed and an upshift of the main transmission unit from 1st to 2nd speed. However, the conventional controller which makes use of shift valves and accummulators is not constructed to simultaneously effect both shifting operations. Therefore, practically, either one of the shifting operations lags behind the other. For instance, when a downshift operation is completed first, the automatic transmission as a whole is first shifted down to the first speed to reduce speed greatly and is then upshifted to the third speed to drastically increase speed. Conversely, when the upshift is completed first, the automatic transmission as a whole is first upshifted to the fourth speed to drastically increase in speed and is then downshifted to reduce speed. In both cases, the engine is abruptly accelerated or decelerated and a large impact is generated in the automatic transmission, thereby impairing the driveability of the automobile.

SUMMARY OF THE INVENTION

Accordingly, an object of the invention is to provide a hydraulic circuit for controlling an automatic transmission which is capable of adequately controlling the release servo pressure of a hydraulic servomotor thereby enabling the control of the slip characteristics of the associated frictional engagement element, e.g. the timing of commencement of the slip, duration of the slip and the timing of termination of the slip in the frictional engagement element, thereby attaining smooth speed changing characteristics of the automatic transmission.

According to the invention, as shown in FIGS. 1 and 2, a control valve 66 is connected between a shift valve 53 and a hydraulic servomotor Bo which controls a frictional engagement element. The control valve 66 in turn is controlled by a signal from a controlling means $S_D$ or $S_{D'}$, 41, in such a manner that, when there is a demand for the draining of the hydraulic servomotor Bo by the shift valve 53, the servo pressure is not directly reduced to zero but is first reduced to a predetermined level by the operation of the control valve 66 and then the servomotor Bo is drained completely.

When releasing the hydraulic servomotor by the shit valve, since the servo pressure of the hydraulic servomotor is first reduced to the predetermined pressure by the control valve, it is possible to freely control the release pressure of the hydraulic servomotor and hence, the timing of the release of the frictional engagement element in accordance with factors such as the torque, the vehicle speed and the timing of engagement of another frictional engagement element, without being restricted by the hydraulic characteristics of the accummulator. This in turn permits a free control of the characteristics such as the timing of commencement of the slip, duration of the slip and the timing of termination of the slip, thereby allowing the automatic transmission to perform a smooth speed changing operation.

BRIEF DESCRIPTION OF THE DRAWINGS

FIG. 8 shows states of various elements of the automatic transmission in different phases of operation;

DESCRIPTION OF THE PREFERRRED EMBODIMENTS

Figure 1:
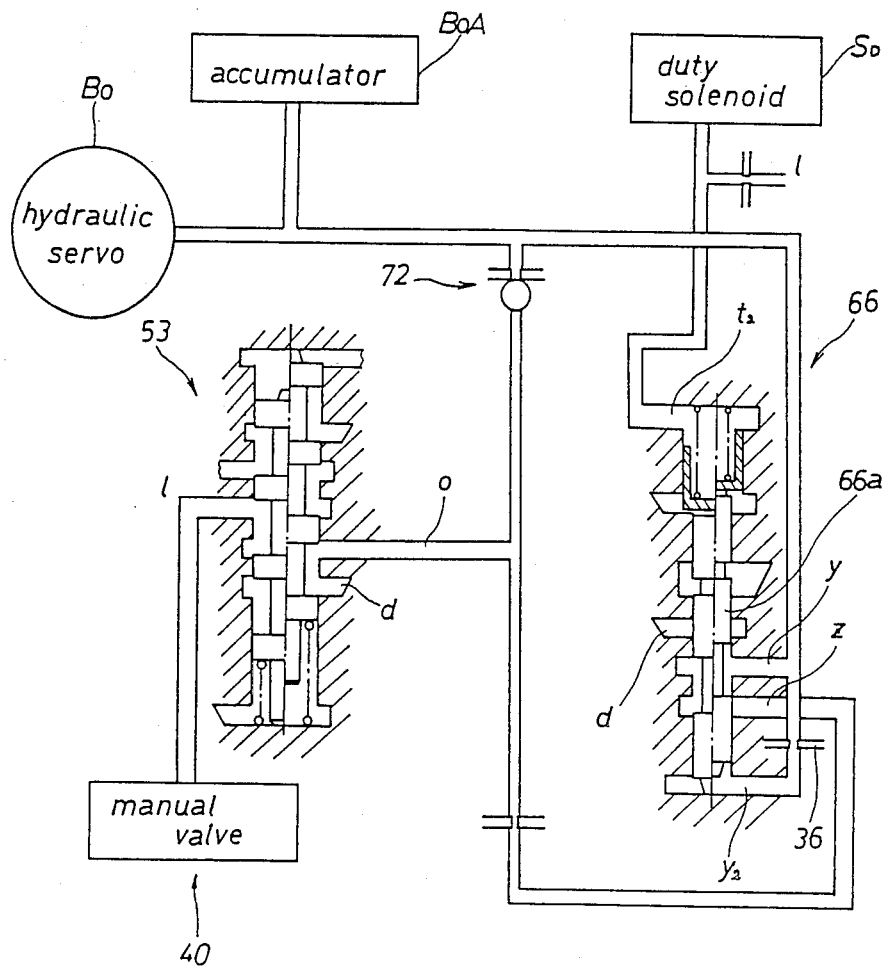
FIG. 1 is a hydraulic circuit diagram of a hydraulic controlling circuit embodying the invention for controlling an automatic transmission.
Figure 2:
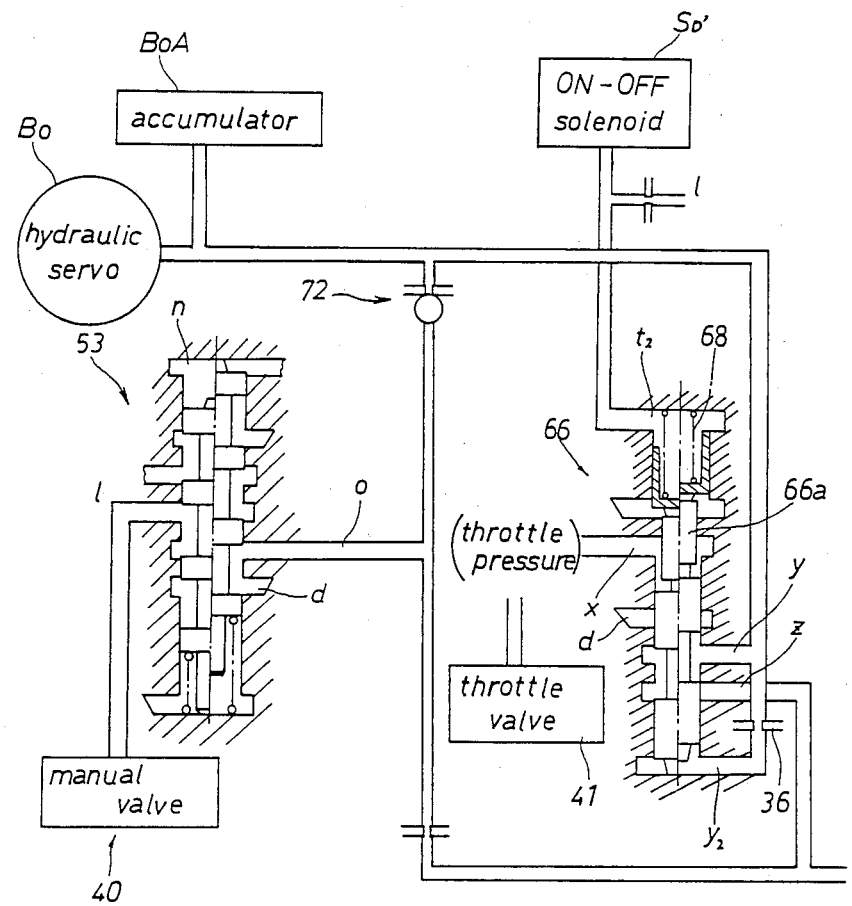
FIG. 2 is a circuit diagram similar to that shown in FIG. 1, showing another embodiment of the invention.

FIG. 1 shows an embodiment of the invention in which the control means consists of a solenoid valve $S_D$ which is operative under a duty ratio control in accordance with factors such as torque, the vehicle speed, the timing of engagement of another frictional engagement element, and so forth, so as to actuate the reduced pressure to a control oil chamber $t_2$ of the control valve 66. On the other hand, FIG. 2 shows another embodiment in which the control means consists of both a solenoid valve $S_D'$ operative under on-off control and a throttle valve 41. In this case, therefore, the hydraulic pressure derived from the solenoid valve $S_D'$ and the throttle pressure from the throttle valve 41 are used as the control signals. More specifically, the hydraulic pressure from the solenoid valve $S_D'$ acts in the control oil chamber $t_2$ of the control valve 66, while the throttle pressure acts on a spool 66a of the control valve 66 through an oil chamber x.

A description will be made hereinunder as to a practical embodiment of the invention applied to a multi-speed automatic transmission having a main transmission unit and a sub-transmission unit, with specific reference to FIGS. 3 and 4.

An overdrive (O/D) brake is adapted to be controlled by a hydraulic servomotor Bo (referred to simply as brake Bo, hereinunder and similar abbreviations will also apply to other hydraulic servomotors for other brakes and clutches. The release pressure of the brake Bo is controlled by a release control valve 66 which is disposed between an O/D brake Bo and a third shift valve 53. The control valve 66 in turn is controlled by a solenoid valve $S_D$ in accordance with a control signal from a control portion E which produces the control signal upon receipt of a signal from a rotational sensor $A_2$ capable of sensing the rotation speed of a suitable element 30 of the main transmission unit 21 (and a signal from another rotation sensor $A_2$ capable of detecting the rotational speed of a suitable element 23 of the sub-transmission unit 21) in such a manner that the downshift operation in the sub-transmission unit, e.g., the downshift from the overdrive (O/D) speed to the direct-coupling speed, which is effected by the release of the O/D brake Bo, is synchronized with upshifting in the main transmission unit 21, e.g. the upshifting of the first speed gear to the second speed gear, which is effected by engagement of a brake $B_2$ in the main transmission unit 21.

In the arrangement shown in FIG. 1, the duty solenoid valve $S_D$ is used for the purpose of reducing the pressure in the control oil chamber $t_2$ of the control valve 66 to a predetermined level. On the other hand, FIG. 2 shows another arrangement in which the control oil chamber $t_2$ is adapted to be drained by an on-off solenoid valve $S_D'$ and the throttle pressure introduced into an oil chamber x acts on the spool 66a. In either case, the spool 66a is moved upward by a predetermined amount in accordance with the pressure in a lower chamber $y_2$ communicating with the hydraulic servomotor Bo and the accummulator BoA, so as to suitably restrict the communication between the port y and the drain port d. Consequently, the servo pressure in the hydraulic servomotor Bo is released through the port y and the drain port d at a rate corresponding to the duty ration of the solenoid valve $S_D$ or the throttle opening, thereby suitably controlling the state of slip in the frictional engagement element which is in this case the O/D brake. Then, the shift valve 53 is switched so that a port o is brought into communication with the drain port d, as illustrated at the right half part in the Figure, so that the hydraulic servomotor Bo is completely drained through the check valve 72.

When the automatic transmission as a whole is upshifted from, for example, second to third speed, the main transmission unit 21 upshifts from the 1st speed gear to the 2nd speed gear, as a result of the engagement of the brake $B_2$, while the sub-transmission unit 16 downshift from the overdrive (O/D) speed to the direct-coupling speed as a result of the release of the brake Bo and engagement of the clutch Co, as will be explained later in connection with FIGS. 10 and 11. During this operation, the solenoid valve $S_D$, which is being supplied with the modulator pressure modulated by a modulator valve 65, operates under the duty ratio control or on control in accordance with the signal from the control portion E, so as to control the Bo release control valve 66, thus effecting the control of the releasing operation of the O/D brake Bo. Therefore, the release of the brake Bo in the sub-transmission unit 16 can be effected simultaneously with the engaging operation of the brake $B_2$ in the main transmission unit 21.

Although the embodiments described hereinbefore are applied to a multi-speed automatic transmission which consists of the combination of an overdrive (O/D) planetary gear unit and a pair of planetary gear units, this application is not exclusive and the invention can be applied to various types of multi-speed automatic transmissions having hydraulic servomotors, e.g. a multi-speed automatic transmission having a combination of an underdrive (U/D) planetary gear unit and two planetary gear units, a split-type four-speed automatic transmission in which two planetary gear units are connected through the intermediary of a clutch as disclosed in Japanese Patent Laid-Open No. 183147/1984, a non-split type four-speed automatic transmission comprised of two planetary gear units, a multi-speed transmission in which the split or non-split four speed transmission is combined with an overdrive (O/D) or underdrive (U/D) planetary gear unit, or even to an ordinary automatic transmission having three speeds.

A practical embodiment of the invention will be explained hereinunder with reference to the accompanying drawings.

Figure 5:
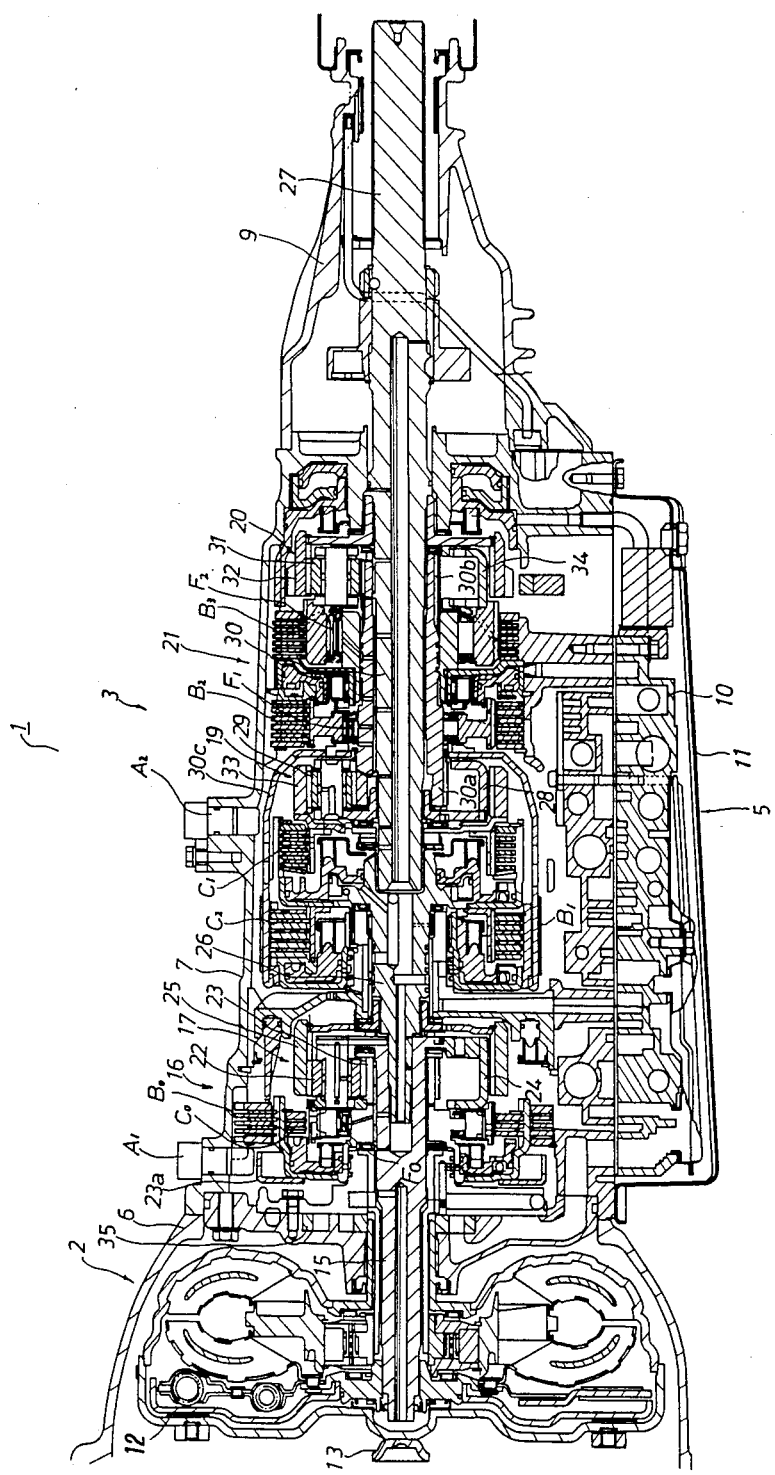
FIG. 5 is a sectional view of an automatic transmission to which the invention is applied.

As shown in FIG. 5, a multi-speed automatic transmission 1 is equipped with a torque converter 2, planetary speed changing gear mechanism 3 and a hydraulic control mechanism 5 which are housed, respectively, in a converter housing 6, transmission case 7 and an extension housing 9, and a valve body 10 and an oil pan 11. The torque converter 2 has a lock-up clutch 12. The power supplied to the input shaft 13 of the torque converter 2 is hydrodynamically transmitted to the input shaft 15 of the speed changing gear mechanism 3 through the intermediary of the oil in the torque converter or, alternatively, mechanically transmitted through the lock-up clutch 12. The speed changing gear mechanism 3 is comprised of a sub-transmission unit 16 consisting of an O/D planetary gear unit 17, and a main transmission unit 21 consisting of a front planetary gear unit 19 and a rear planetary gear unit 20. The O/D planetary gear unit 17 is comprised of a carrier 24 directly connected to the input shaft 15 and carrying planet gears 22, a sun gear 23 on the input shaft 15, and a ring geare 25 directly connected to the input shaft 26 of the main transmission unit 21. An O/D-direct clutch Co and a one-way clutch Fo are connected between the carrier 24 and the sun gear 23, while an O/D brake Bo is connected between the sun gear 23 and the case 7. The front planetary gear unit 19 has a carrier 28 directly connected to the output shaft 27 and carrying planet gears 29, a sun gear $30a$ on the output shaft 27 and formed as a unit with the sun gear $30b$ of the rear planetary gear unit 20, and a ring gear 33 which is connected to the input shaft 26 through a forward clutch $C_1$. A direct clutch $C_2$ is connected between the input shaft 26 and the sun gear 30, while a second coast brake $B_1$ acts between the sun gear 30 and the case 7. Furthermore, a second brake $B_2$ is provided between the sun gear 33 and case 7 through the intermediary of a one-way clutch $F_1$. Finally, the rear planetary gear unit 20 has a carrier 34 carrying planet gears 31, the sun gear $30b$ mentioned above, and a ring gear 32 directly connected to the output shaft 27. A 1st & Rev brake $B_3$ and a one-way clutch $F_2$ are arranged in parallel with each other between the carrier 34 and the case 7. In FIG. 5, a reference numeral 35 denotes an oil pump.

A rotation sensor $A_1$ consisting of a photo-electric sensor or an electromagnetic sensor is mounted on the portion of the case 7 around the O/D planetary gear unit 17. On the other hand, slits or holes are formed at a regular interval in the flange piece $23a$ connected to the sun gear 23. Thus, the rotation sensor $A_1$ is capable of detecting the rotational speed of the sun gear 23, i.e., the state of shift of the sub-transmission unit 16. A similar rotation sensor $A_2$ is mounted on the portion of the case 7 near the front planetary gear unit 19. On the other hand, notches or holes are formed at a regular interval in a clutch connecting piece $30c$ which extends from the sun gear 30. Thus, the rotational sensor $A_2$ detects the rotation speed of the sun gear 30, i.e., the state of shift of the main transmission unit 21.

Figure 6:
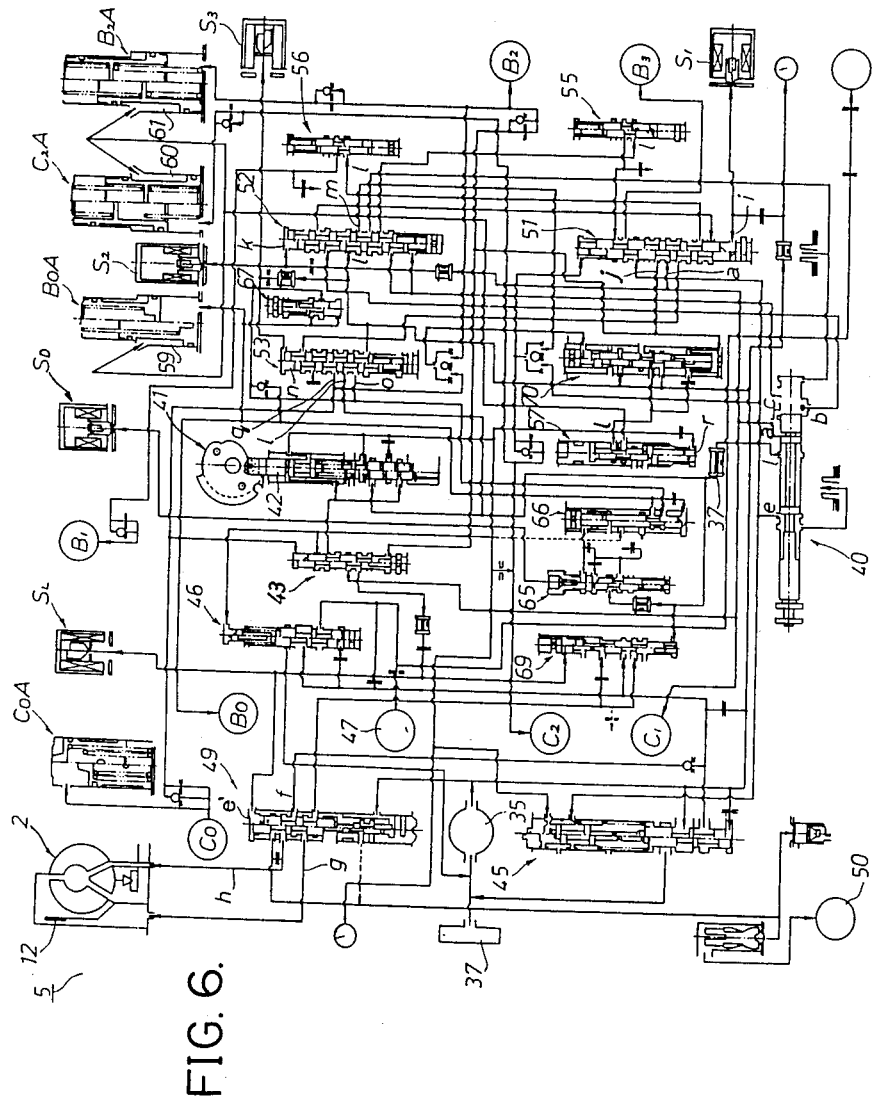
FIG. 6 is an illustration of a hydraulic control mechanism for the automatic transmission.

As will be seen from FIG. 6, the hydraulic speed changing control mechanism 5 is comprised of various parts such as valves, as well as other constituents such as accummulators, orifices and a filter.

Figure 7:
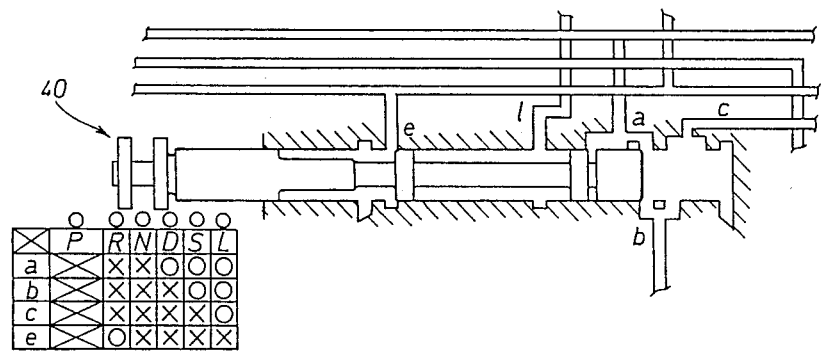
FIG. 7 is an illustration of a manual valve.

A description will be made hereinunder as to the functions of respective valves. The manual valve 40 is adapted to be operated so as to select one of the ranges P, R, N, D, S and L, thereby switching the oil passages a, b, c and e as shown in FIG. 7. The oil passage l has oil therein under a line pressure. A throttle valve 41 is associated with a downshift plug 42. A cam is rotated in response to the depression of an accelerator pedal, so that a throttle pressure corresponding to the engine power is obtained. The cut-back valve 43 produces cut-back pressure when the automatic transmission selects speeds other than the first speed, and R,P and N range. The cut-back pressure acts on the throttle valve 41 so as to lower the throttle pressure. A primary regulator valve 45 is operated by the throttle pressure, so as to produce a line pressure corresponding to the load. Namely, during heavy load operation, the primary regulator valve 45 increases the line pressure so as to ensure the operation of the clutches C and brakes B, whereas, during light load operation, it regulates the line pressure to a comparatively low level. A secondary regulator valve 46 is adapted to be operated by the pressure derived from the primary regulator valve 45 so as to control the pressure of the converter oil supplied to the converter 2, as well as the pressure of the lubricating oil which is supplied to various parts 47 which need lubrication.

The lock-up relay valve 49 is controlled by the solenoid valve $S_L$, so as to switch the flow of the oil to the lock-up clutch 12 and the oil cooler 50.

Namely, as a result of the energization of the solenoid of the solenoid valve $S_L$, the line pressure is introduced into the upper end oil chamber e', whereby the converter pressure oil passage f, the pressure in which is regulated by the secondary regulator valve 46, is disconnected from the lock-up clutch off passage g and, instead, is connected to the lock-up clutch on passage h, while allowing the lock-up clutch off passage g to communicate with the drain line.

A first shift valve 51 is adapted to conduct a switching of the main transmission unit 21 between the 1st speed gear and the 2nd speed gear, i.e. first speed and third speed of the transmission 1 as a whole. The first shift valve 51 is operated by a solenoid valve $S_1$. More specifically, as the solenoid of the solenoid valve $S_1$ is de-energized, the line pressure is introduced into the oil chamber i, so that the line pressure passage a is blocked when the manual valve 40 selects one of the D, S and L ranges. Conversely, when the solenoid of the solenoid valve $S_1$ is energized, the oil passage a is brought into communication with the oil passage j, so that the line pressure is supplied to the brake $B_2$ and also to a $B_2$ accumulator $B_2A$.

A second shift valve 52 is adapted to conduct the shifting in the main transmission unit 21 between the 2nd speed gear and the 3rd speed gear, i.e. between third speed and fifth speed of the automatic transmission as a whole, as it is operated under the control of a solenoid valve $S_2$. Namely, when the solenoid of the solenoid valve $S_2$ is de-energized, the line pressure is introduced into the oil chamber k, and the line pressure passage 1 communicates with the oil passage m, whereby the line pressure is supplied to the direct clutch $C_2$ and also to the $C_2$ accummulator $C_2A$. The line pressure passage, however, is blocked when the solenoid of the solenoid valve $S_2$ is energized.

A third shift valve 53 is adapted to conduct a switching of the state of the sub-transmission unit 16, under the control of a solenoid valve $S_3$. Namely, as the solenoid of the solenoid valve $S_3$ is energized, the line pressure is introduced into the oil chamber n, so that the line pressure passage 1 is brought into communication with the oil passage o, whereby the line pressure is supplied through a below-described Bo release control valve 65 to the O/D brake Bo and also to the Bo accumulator BoA. However, as the solenoid of the solenoid valve $S_3$ is de-energized, the line pressure passage 1 is brought into communication with the oil passage q, thereby supplying the line pressure to the O/D direct clutch Co and a Co accummulator CoA.

A first coast modulator valve 55 is supplied with the line pressure from the oil passage 1 through the port c via the second shift valve 52 when the manual valve 40 is in the L range, and regulates this pressure into a coast modulator pressure which is supplied through the first shift valve 51 to a 1st & Rev brake $B_3$.

A second coast modulator valve 56 is supplied with the line pressure from the oil passage 1 through the port b via the second shift valve 52 and the first shift valve 51, when the manual valve 40 is in the S range, and regulates the pressure to the coast modulator pressure which is supplied to the 2nd brake $B_1$.

A first accummulator control valve 57 has an oil chamber r which is supplied with the throttle pressure. In response to this throttle pressure, the first accummulator control valve 57 regulates the oil pressure which is supplied through a below-described second accummulator control valve 70, thereby producing an accummulator control pressure which is supplied to back pressure chambers 59, 60 and 61 of the respective accummulators BoA, $C_2A$ and $B_2A$.

Besides the hydraulic components mentioned hereinabove, the hydraulic speed changing control mechanism 5 has various valves such as an $S_D$ modulator valve 65, Bo release control valve 66, Bo sequence valve 67, lock-up control valve 69 and the second accummulator control valve 70.

Figure 3:
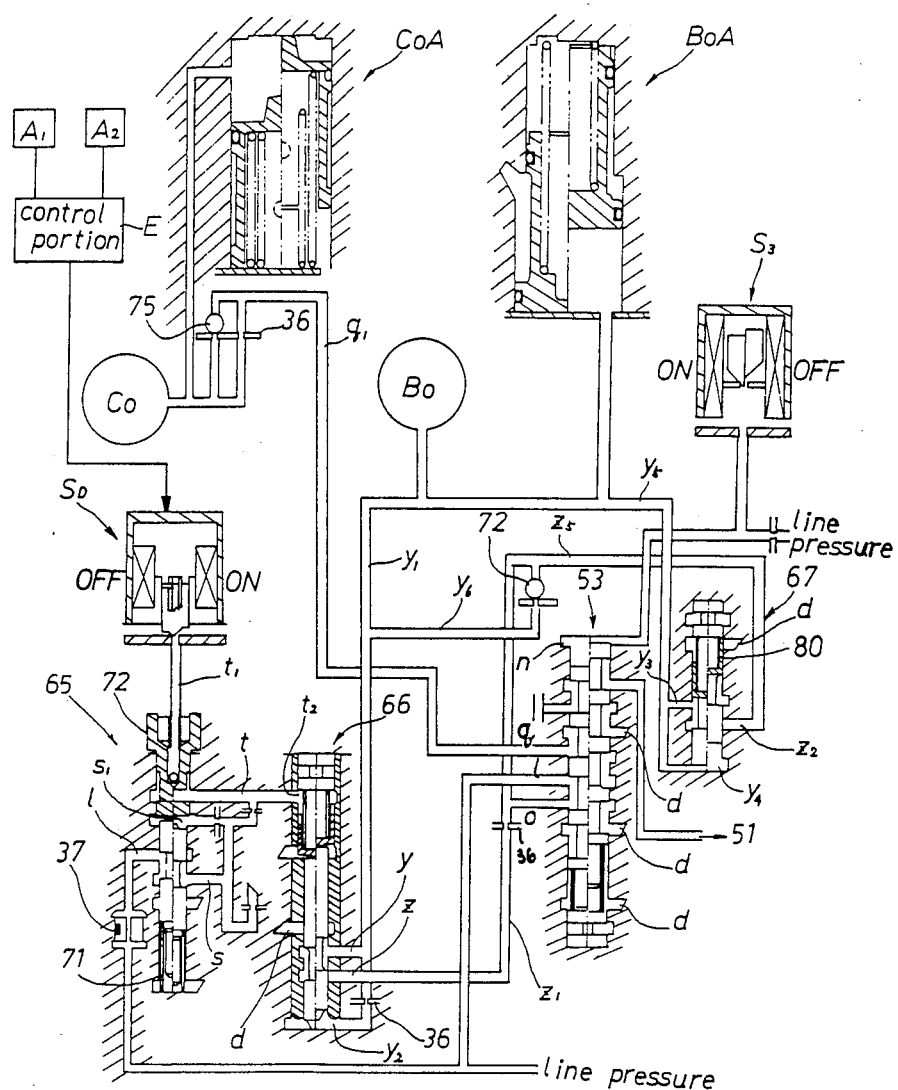
FIG. 3 is an illustration of a practical embodiment of the invention applied to a multi-speed automatic transmission having a main transmission unit and a sub-transmission unit.

As shown in detail in FIG. 3, the $S_D$ modulator valve 65 receives the line pressure from the line pressure port 1 via the oil filter 37. The line pressure port 1 further communicates with the upper end oil chamber $s_1$ through an oil passage s, so as to serve as a feedback pressure. This feedback pressure produces a downward force which acts counter to the upward force of a spring 71, thereby producing a predetermined pressure of, for example, 4 kg/cm$^2$. The thus regulated solenoid modulator pressure is supplied to the oil passage t. In addition, the oil passage t communicates with the solenoid valve $S_D$ through a plug 72 and an oil passage $t_1$ and also with a Bo release control valve 66. The control pressure produced by the duty-ratio control of the solenoid valve $S_D$ is supplied to the oil chamber $t_2$, thereby controlling the control valve 66. The solenoid valve $S_D$ is controlled by signals which are issued by a control portion E in accordance with the output from the rotation sensors $A_1$, $A_2$. The port y of the Bo release control valve 66 communicates with the O/D brake Bo and the Bo accummulator BoA through an oil passage $y_1$, and also with a lower end oil chamber $y_2$ through an orifice 36. The oil pressure introduced into the lower end oil chamber $y_2$ serves as a feedback pressure. The brake $B_o$ and the $B_o$ accumulator $B_oA$ also communicate with a by-pass passage $y_5$. The by-pass passage $Y_5$ communicates with port $y_3$ of the sequence valve 67, and further with the lower end oil chamber $y_4$ of the valve 67. The pressure introduced into the lower end oil chamber $y_4$ serves as feedback pressure. The feedback pressure acting in the oil chamber $y_4$ produces a force which balances the force of a spring 80 on the upper side. The spring 80 is adjusted so that it produces a force corresponding to the initial piston operation pressure at which the brake disks of the O/D brake Bo commence to contact with each other. Thus, the sequence valve 67 takes the position shown at the left half part in the Figure, until the pressure is increased to the initial piston operation pressure, so that the hydraulic pressure is supplied to the O/D brake Bo through the port $z_2$ and the port $y_3$. However, when the initial piston operation pressure is exceeded, the sequence valve 67 is switched to the position shown at the right half part of FIG. 3 so that the ports $z_2$ and $y_3$ are blocked. The port z of the control valve 66 communicates with the port o of the third shift valve 53 through the oil passage $z_1$ and the orifice 36. The port o in turn is communicated with a port $z_2$ of the sequence valve 67, through a by-pass passage $z_5$. On the other hand, an oil passage $y_6$ branching from the oil passage $y_1$ communicates with the by-pass passage $z_5$ through a check valve 72. On the other hand, the third shift valve 53 has an upper chamber n which communicates with the solenoid valve $S_3$, while its port 1 communicates with the line pressure passage. The third shift valve 53 further has a port q which communicates with the O/D-direct clutch Co and the Co accumulator CoA through an oil passage $q_1$ and an orifice 36. A check valve 75, which permits the discharge of oil from the clutch Co, is connected in parallel to the orifice 36 in the oil passage $q_1$. A symbol d represents a drain port.

Figure 4:
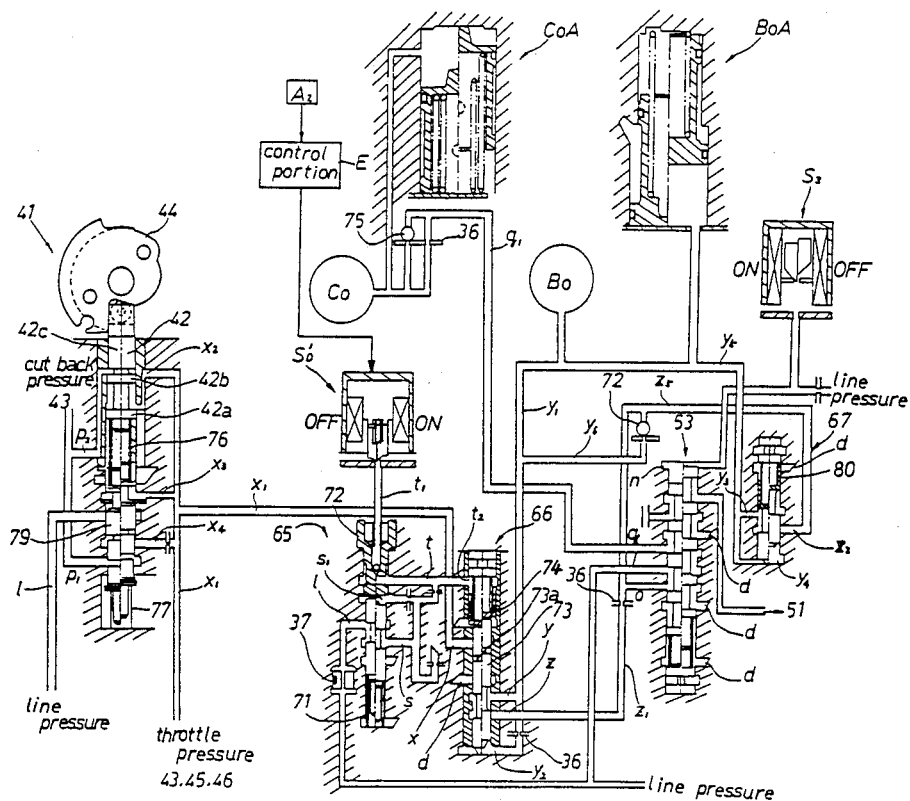
FIG. 4 is an illustration of a modification of the practical embodiment shown in FIG. 3.

FIG. 4 shows a modified embodiment in which the Bo release control valve 66 is controlled by the pressure derived from an on-off control type solenoid valve $S_D{}'$ and the throttle pressure from the throttle valve 41.

The Bo release control valve 66 has a port x through which hydraulic pressure is transmitted to act on a stepped portion 73a of a spool 73. This pressure produces a force which acts, in combination with the force of a spring 74, on the spool 73 so as to balance a force produced by the Bo feedback pressure acting in the lower oil chamber $y_2$. Furthermore, the port x communicates with ports $x_2$, $x_3$ and $x_4$ of the throttle valve 41 through an oil passage $x_1$ which in turn is supplied with $x_3$ the throttle pressure, through the port $x_3$, converted from the line pressure from the line port 1. More specifically, the throttle valve 41 is provided with a downshift plug 42 adapted to be operated by a throttle cam 44 which is operatively connected to an accelerator pedal, as well as a throttle spool 79 operatively connected with the plug 42 through a spring 76 and upwardly urged by a lower spring 77. The arrangement is such that, as the spool 79 is lowered through the action of the spring 76 in response to the rotation of the throttle cam 44, the line pressure from the line port 1 is throttled to a level corresponding to the throttle opening and the thus throttled pressure is delivered to the throttle port $x_3$. The throttle pressure also is transmitted to the port $x_4$, while the port $p_1$ receives the cut-back pressure. These pressures produce, due to a difference in the diameter of the lands of the spool 79, an axial force which acts to force the spool 79 back against the force of the spring 76, so that the spool is moved to the position where the axial forces are balanced, thereby restricting the line port 1, and thus producing throttle pressure which corresponds to both the throttle opening and the vehicle speed. The downshift plug 42 has lands 42a, 42b and 42c. The oil pressure from the port $x_2$ acts on the lands 42a, 42b of the downshift plug 42 (the diameter of the land 42a being greater than that of the land 42b) while the cut-back pressure transmitted to the port $p_2$ acts on the lands 42b, 42c (the diameter of the land 42b being greater than that of the land 42c). These pressures in combination produce a force which serves to reduce the force produced by the springs 76, 77 so as to press the downshift plug 42 onto the throttle cam 44.

On the other hand, the lock-up control valve 69 has a function of allowing the torque converter to be locked up when the sub-transmission unit 16 is in the O/D mode, i.e. when the automatic transmission as a whole is in second speed or a higher speed, even when the main transmission unit 21 selects the 1st speed gear, as well as the known function for allowing the torque converter to be locked up when ever the main transmission unit 21 selects the second or a higher speed gear.

The second accumulator control valve 70 is provided for the following reason. When the main transmission unit 21 is upshifted while the sub-transmission unit 16 selects the O/D speed, the capacities of the brakes in the main transmission are excessive as compared with the those of the sub-transmission unit when in the direct coupling mode. In such a case, therefore, the second accumulator control valve 70 lowers the pressure supplied to the back pressure chambers 59, 60 and 61 of the accummulators BoA, $C_2A$ and $B_2A$, thereby optimizing the brake capacities.

The operation of the embodiment explained hereinbefore is as follows.

The table in FIG. 8 shows the states of various operational elements of the multi-speed automatic transmission 1 such as the solenoid valve $S_1$, $S_2$, $S_3$, $S_L$, $S_D$, clutches Co, $C_1$, $C_2$, brakes Bo, $B_1$, $B_2$, $B_3$ and one-way clutches (OWC) $F_o$, $F_1$, $F_2$, in respective ranges P,R and N and at respective speeds in ranges D, S and L.

Figure 9:
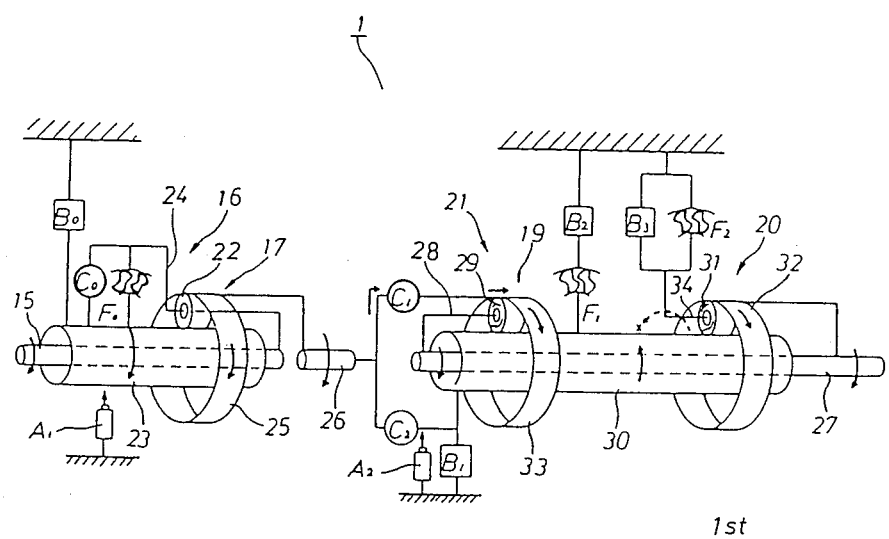
FIGS. 9 to 15 are illustrations of states of the automatic transmission in different phases of operation.

When the automatic transmission selects the first speed in D or S range, the O/D direct clutch Co, one-way clutches Fo, $F_2$ and the forward clutch $C_1$ are held in engaged states, while other elements are disengaged, as shown in FIG. 9. In the sub-transmission unit 16, therefore, the planetary gear unit 17 rotates as a unit because the clutch $C_o$ and the one-way clutch Fo are engaged, so that the rotation of the input shaft 15 is directly transmitted to the input shaft 26 of the main transmission unit 21. The rotation of the input shaft 26 is transmitted through the clutch $C_1$ to the ring gear 33 of the front planetary gear unit 19 and is further transmitted to the carrier 28 and the output shaft 27 which is integral with the carrier 28. At the same time, this rotation tends to cause a counter-clockwise rotation of the carrier 34 of the rear planetary gear unit 20 through the sun gear 30. However, the counter-clockwise rotation of the carrier 34 is prevented by the one-way clutch $F_2$ so that the planet gears 31 rotate about their axes, thereby transmitting rotation to the ring gear 32 which is integral with the output shaft 27. Thus, the main transmission unit selects the 1st speed gear, while the sub-transmission unit 16 is in the direct coupling state, whereby the transmission as a whole is in first speed. In this state, part of the power is transmitted to the output shaft 27 through the front planetary gear unit 19, while part of the power is transmitted through the rear planetary gear unit 20. That is, the load is shared by both planetary gear units.

Figure 10:
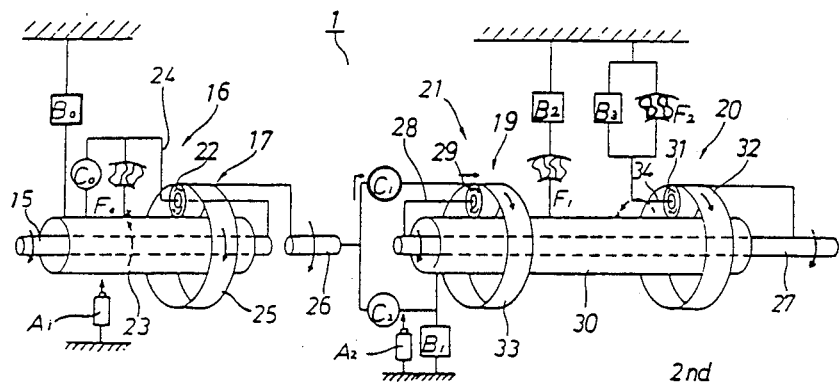

When the second speed is selected in D or S range, the O/D brake Bo, one-way clutch $F_2$ and the forward clutch $C_1$ are engaged, while other elements are disengaged, as shown in FIG. 10. Therefore, in the sub-transmission unit 16, the sun gear 23 is locked by the brake Bo, while the carrier 24 is rotated causing the planet gears 22 to rotate about their axes, thereby transmiting power to the ring gear 25, whereby the input shaft 26 of the main transmission unit 21 is driven at an increased speed, i.e. the overdrive mode O/D is attained. On the other hand, the main transmission unit 21 still selects the 1st speed gear as in the case where the automatic transmission as a whole is in first speed, so that the transmission as a whole selects the second speed by the coupling between the first speed gear selected by the main transmission unit 21 and the overdrive (O/D) selected by the sub-transmission unit 16.

In this state, the solenoid of the solenoid valve $S_3$ is energized as shown in FIGS. 3 and 4, so that the line pressure is supplied through the upper chamber n of the third shift valve 53, whereby the third shift valve 53 is switched to the state shown at the left half part in the Figure. As a result, the pressurized oil is drained from the clutch Co and the accummulator CoA to the drain port d via the port q, so that the clutch Co is disengaged and the line pressure port 1 is brought into communication with the port o. When the line pressure from the port o is below the initial piston operation pressure, the line pressure is supplied directly to the O/D brake Bo through the ports $z_2$ and $y_3$ of the sequence valve 67, and the by-pass passage $y_5$. However, when the initial piston operation pressure is exceeded, the sequence valve 67 is switched to the position shown at the right half part by the force produced by the feedback pressure acting in the oil chamber $y_4$, so that the line pressure from the port o is delivered to the port z of the Bo release control valve 66 through the orifice 36 and the oil passage $z_1$. Meanwhile, the control valve 66 is held in the position shown at left half part in the Figure, so that the port z and the port y are open to each other, whereby the line pressure is supplied to the brake Bo and the Bo accummulator BoA through the oil passage $y_1$, thereby engaging the brake Bo.

Figure 11:
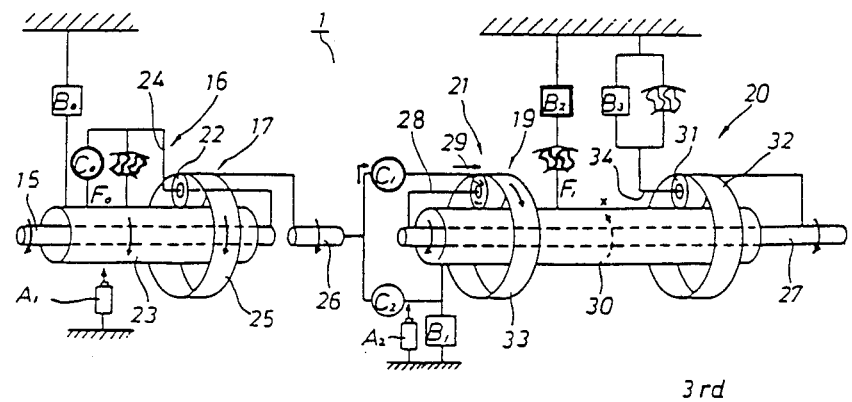

When the transmission is in third speed in D range, the O/D clutch Co, one-way clutch Fo, forward clutch $C_1$, one-way clutch $F_1$ and the brake $B_2$ are engaged, while other elements are disengaged, as shown in FIG. 11. Therefore, the sub-transmission unit 16 assumes the direct coupling mode as explained above, so that the rotation of the input shaft 15 thereof is directly transmitted to the input shaft 26 of the main transmission unit 21. In the main transmission unit 21, the rotation of the input shaft 26 is transmitted to the ring gear 33 of the front gear unit 19 through the clutch $C_1$, tending to cause counterclockwise rotation of the sun gear 30 through the planet gear 29. However, since the sun gear 30 is locked against counter-clockwise rotation by the one-way clutch $F_1$ due to the engagement of the brake $B_2$, the carrier 28 is rotated while allowing the planet gear 29 to rotate about its axis. Thus, the rotation of the input shaft 26 is transmitted to the output shaft 27 at the 2nd speed only through the front gear unit 19. Consequently, the transmission 1 as a whole shifts to third speed which is obtained by the combination of the direct-coupling speed of the sub-transmission unit 16 and the 2nd speed provided by the main transmission unit 21.

In this state, the solenoid of the solenoid valve $S_1$ is energized so that the first shift valve 51 is switched to the state shown at the left half part in FIG. 6, so that the line pressure passage 1 communicates with the port j, and the line pressure is supplied to the brake $B_2$ and the accummulator $B_2A$. The speed changing operation of the main transmission unit 21, i.e. the change in the rotational speed of the sun gear 30, is sensed by the rotary sensor $A_2$, so that the duty-ratio control (see FIG. 3) or on control (see FIG. 4) of the solenoid valve $S_D$ or $S_D'$ is effected by the electric signal coming from the control portion E, thereby reducing the modulator pressure in the oil passage t. Namely, when the duty ratio control is conducted as shown in FIG. 3, the $S_D$ modulator valve 65 receives the line pressure through the line port l and regulates this pressure by the force of the spring 71 and the force produced by the pressure fed back to the upper chamber $s_1$, thus producing a regulated pressure which is delivered to the oil passage t. This modulator pressure is reduced as a result of the duty-ratio control of the solenoid valve $S_D$ so that the pressure is reduced also in the upper chamber $t_2$ of the release control valve 66 which communiates with the oil passage t. Therefore, the control valve 66 is switched to the position shown at the right half part in FIG. 3 by the pressure which is fed back to the lower chamber $y_2$ from the brake Bo, so that the oil from the brake Bo and the accummulator BoA is drained from the drain port d via the oil passage $y_1$ and the port y.

Thus, the reduction in the speed of the sun gear 30 in the main transmission unit 21, attributable to the engagement of the brake $B_2$, is sensed by the rotation sensor $A_2$, whereas the increase in the speed of the sun gear 23 in the sub-transmission unit 16, attributable to the release of the brake Bo, is sensed by the rotation sensor $A_1$. Upon receipt of the signals from both sensors $A_1$ and $A_2$, the control section E produces a signal for controlling the duty ratio of the solenoid valve $S_D$, thus controlling the release pressure of the O/D brake Bo in such a manner than the timing of the releasing operation of the O/D brake Bo coincides with the timing of the engaging operation of the brake $B_2$.

Figure 16:
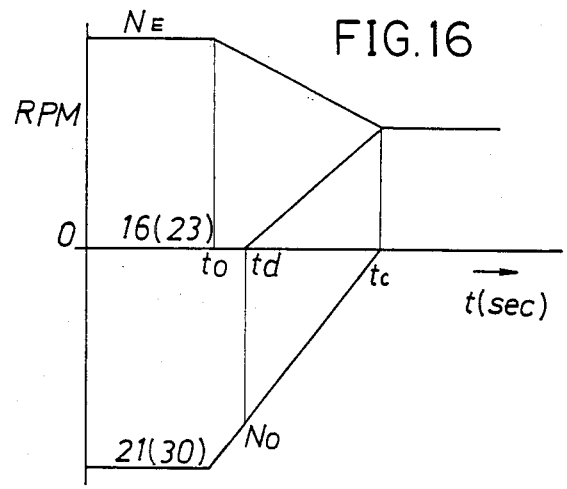
FIG. 16 is an illustration of the speed changing operation in the sub-transmission unit and the main transmission unit.
Figure 17:
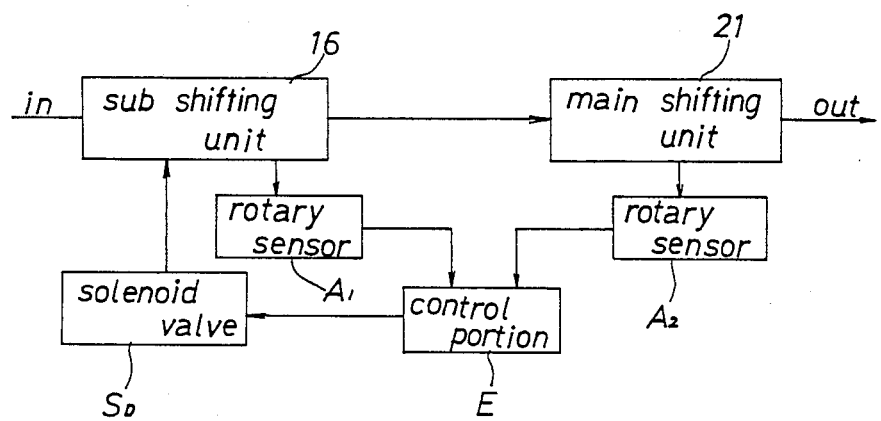
FIG. 17 is a block diagram of an embodiment of the invention.

This operation will be described in more detail with reference to FIG. 16. As the brake $B_2$ starts to engage, the rotation speed of the sun gear 30 in the main transmission unit 21 is decreased. This reduction in the rotation speed is observed by the rotation sensor $A_2$ and, at the same time, the state of increase in the speed of the sun gear 23 in the sub-transmission unit 16 is observed by the rotation sensor $A_1$. The control section E controls, while observing the changes in the speeds of the sun gears 30 and 23, the duty ratio of the solenoid valve $S_D$ so as to release the O/D brake Bo in such a manner that the releasing operation of the brake Bo is completed at the moment $t_c$ (see FIG. 16) at which the sun gear 30 is stopped as a result of completion of the engagement of the brake $B_2$ in the main transmission unit, thereby attaining synchronism between the speed changing operations in both transmission units 16 and 21. Namely, when the completion of the speed changing operation in the main transmission unit 21, i.e. the stopping of the sun gear 30, is detected by the rotation sensor $A_2$, the control portion E produces an electric signal which acts to turn off the solenoid valve $S_3$, thereby switching the third shift valve 53 to the position shown at the right half part in the Figure. As a result, the line pressure port l is brought into communication with the port q, so that the line pressure is supplied to the clutch Co and the Co accummulator CoA through the oil passage $q_1$, thereby causing the clutch Co to be engaged. At the same time, the port o is brought into communication with the drain port d, so that the O/D brake Bo is completely and swiftly drained through the oil passage $y_6$, check valve 72, oil passage $z_1$ and the port o, thus completing the speed changing operation in the sub-unit 16. It will be seen that the speed changing operations in both transmission units 16 and 21 are synchronized, thus enabling the automatic transmission as a whole to smoothly complete the shifting operation.

Figure 18:
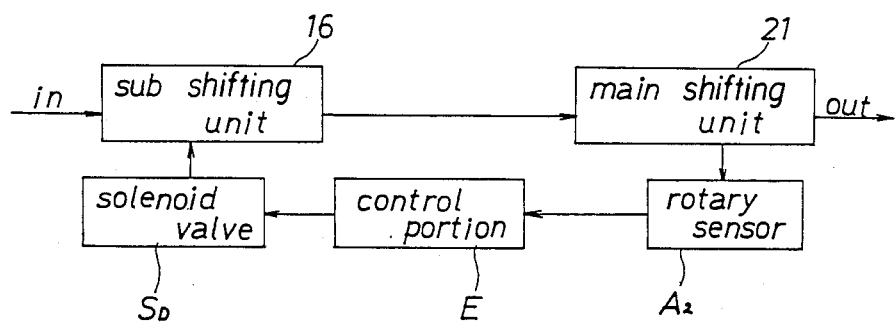
FIG. 18 is a block diagram of another embodiment of the invention.

In the case where the Bo release control valve 66 is controlled through the on-off control of the solenoid valve $S_D'$, the arrangement is such that the $S_D$ modulator valve 65 modulates the line pressure transmitted through the line port l in accordance with the force of the spring 71 and the feed back pressure in the upper oil chamber $s_1$ and delivers the thus modulated pressure into the oil passage t, as will be seen from FIG. 4. This modulated pressure is reduced by the on-control of the solenoid valve $S_D'$ and a pressure reduction is caused also in the upper oil chamber $t_2$ of the Bo release control valve 66 communicating with the oil passage t. Consequently, the control valve 66 is switched to the position shown at the right half part in FIG. 4 by the feedback pressure which is introduced into the lower oil chamber $y_2$ thereof from the brake Bo, so that the brake Bo and the accummulator BoA are drained from the drain port d via the oil passage $y_1$ and the port y. Consequently, as shown in FIGS. 16 and 18, the brake $B_2$ in the main transmission unit 21 is engaged, so that the speed of the sun gear 30 is lowered to a predetermined level $N_o$. This reduction in the speed is detected by the rotation sensor $A_2$ which in turn causes the solenoid valve $S_D'$ to be turned on, thereby releasing the O/D brake Bo. This control is conducted such the release of the brake Bo in the sub-transmission unit is completed at the moment ($t_c$) at which time the sun gear 30 stops rotating as a result of the completion of the engagement of the brake $B_2$ in the main transmission unit. It is thus possible to attain a synchronism of the speed changing operation between both speed changing units 16 and 21.

In the automatic transmission described hereinbefore, there is a risk that the Bo release control valve 66 is fixed in the position shown at the left half part in FIG. 3 due to stick, or as a result of a malfunction of the solenoid valve $S_D$ or $S_D'$. In such a case, the port y cannot communicate with the drain port d. However, the pressurized oil in the brake Bo is relieved into the oil passage $z_1$ through the port y and the port z, as well as through the check valve 72 which is opened during draining, and is further drained to the drain port d through the port o of the third shift valve 53 which takes the position shown at right half part in FIG. 3 when the solenoid of the solenoid valve $S_3$ is not energized. Therefore, the situation in which both the O/D brake Bo and the clutch Co are supplied with the line pressure to lock the O/D planetary gear unit 17 is avoided, if a malfunction of the valve occurs. Thus, safe operation of the automatic transmission is ensured.

Figure 12:
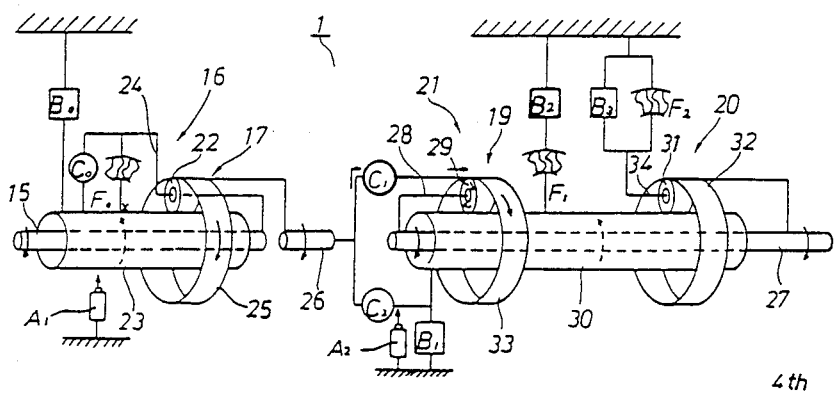

When the transmission 1 as a whole is in fourth speed in D range, the O/D brake Bo, forward clutch $C_1$, brake $B_2$ and the one-way clutch $F_1$ are engaged, while other elements are disengaged, as will be seen from FIG. 12. Therefore, the sub-transmission unit 16 is in the overdrive (O/D) mode as stated before, while the main transmission unit 21 selects the second speed gear and thus, the automatic transmission 1 as a whole attains fourth speed.

Figure 13:
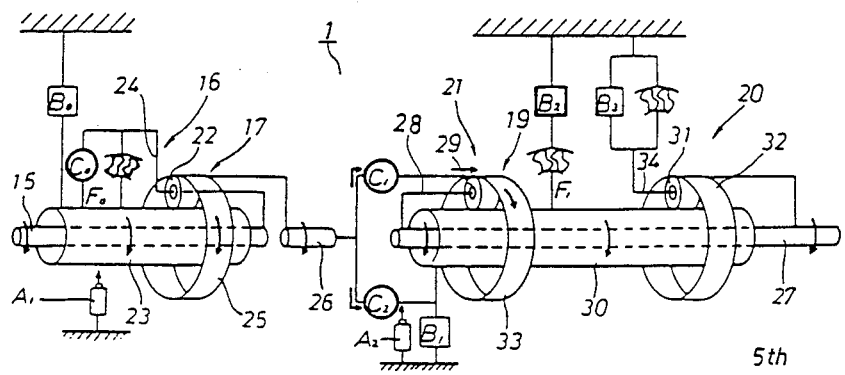

In the fifth speed operation of the automatic transmission in D range, the O/D clutch Co, one-way clutch Fo, forward clutch $C_1$, direct clutch $C_2$ and the brake $B_2$ are engaged, while other elements are disengaged, as shown in FIG. 13. Therefore, the sub-transmission unit 16 is in the direct-coupling mode as stated before. On the other hand, in the main transmission unit 21, since the clutches $C_1$ and $C_2$ are engaged, the front planetary gear unit 19 rotates as a unit so that the rotation of the input shaft 26 is transmitted directly to the output shaft 27. As a result, fifth speed is obtained in the automatic transmission 1 as a whole because the input shaft 15 and the output shaft 27 rotate as if they are integral, by the combination of the direct-coupling state of the sub-transmission unit 16 and the 3rd speed, i.e. direct-coupling state, of the main transmission unit 21.

This upshifting operation may be conducted in the same manner as that when upshifting from the second to the third speed as described above. In such a case, the state of the shifting operation in the main transmission unit 21, i.e. the rotational speed of the sun gear 30, is observed by the rotation sensor $A_2$. The control portion E, upon receipt of the signal from the sensor $A_2$, produces a signal for actuating the solenoid valve $S_D$ and $S_D'$ so as to control the Bo release control valve 66 and, hence, the state of release of the O/D brake Bo. The control portion E also receives the signal from the rotation sensor $A_1$ which observes the rotational speed of the sun gear 23 in the sub-transmission unit 16. Upon receipt of the signals from both rotation sensors $A_1$ and $A_2$, the control portion E controls the solenoid valve $S_D$ and, hence, the pressure in the brake Bo, in such a manner that the shifting operation in the sub-transmission unit 16 is synchronized with the shifting operation in the main transmission unit 21, and finally de-energizes the solenoid of the solenoid valve $S_D$, thereby effecting smooth shifting of the automatic transmission.

Figure 14:
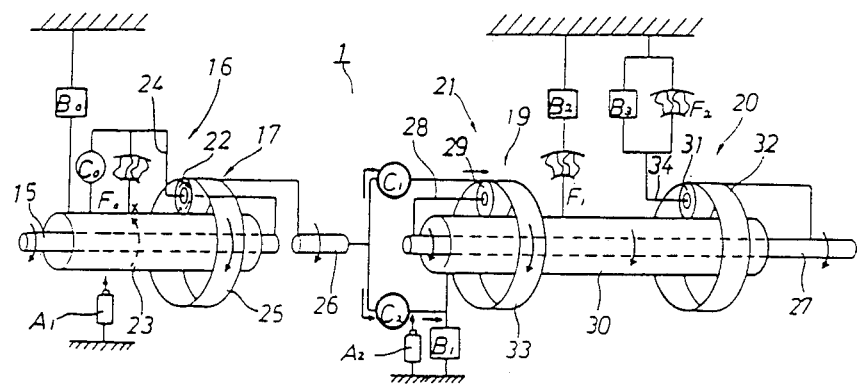

When the automatic transmission 1 selects the sixth speed in D range, the O/D brake Bo, forward clutch $C_1$, direct clutch $C_2$ and the brake $B_2$ are engaged, while other elements are disengaged, as shown in FIG. 14. Therefore, the sub-transmission unit 16 is in the overdrive (O/D) mode as described above, while the main transmission unit 21 selects the 3rd speed gear as described above. Therefore, the automatic transmission as a whole takes the sixth speed, due to the combination of the overdrive mode of the sub-transmission and the 3rd speed of the main transmission unit 21.

Figure 15:
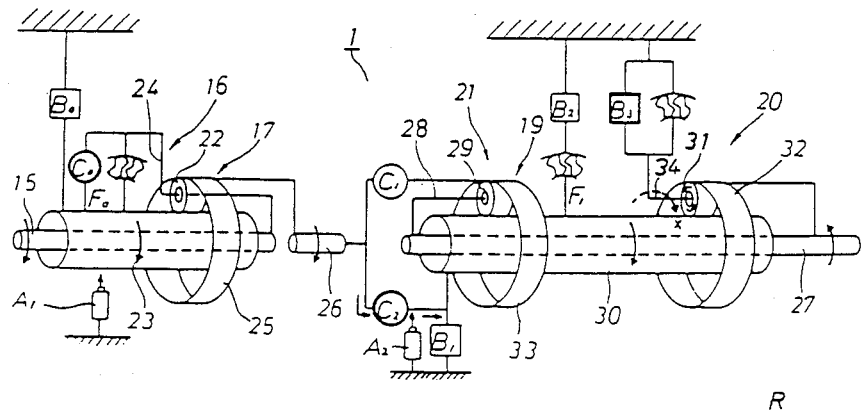

When the manual valve is positioned to select R range, the O/D clutch Co, one-way clutch Fo, direct clutch $C_2$ and the brake $B_3$ are engaged, while other elements are disengaged, as will be seen from FIG. 15. Therefore, the sub-transmission unit 16 is in the direct-coupling mode, whereas, in the main transmission unit 21, the rotation of the input shaft 26 is directly transmitted to the sun gear 30 through the clutch $C_2$. In addition, since the carrier 34 of the rear planetary gear unit 20 is locked against rotation by the brake $B_3$, the rotation of the sun gear 30 is transmitted to the ring gear 32 through the planet gears 31 which rotate about their own axes so as to reverse the direction of rotation, whereby the output shaft 27 is rotated in the counter direction, thus attaining the reversing mode of the automatic transmission.

When the third or fourth speed is selected in S or L range, the operation is similar to that explained in connection with the third and fourth speed operation in D range (see FIGS. 11 and 12) explained above. In S or L range, however, the second coast brake $B_1$ is engaged, so that the sun gear 30 is prevented from rotating in both directions, thus enabling an engine brake to be effected. In upshifting from second speed to third speed, the solenoid valve $S_D$ is controlled so that the sub-transmission unit 16 and the main transmission unit 21 are controlled to shift simultaneously as when in D range.

When the first or second speed is selected in L range, the operation is similar to that with the first or second speed in D range (see FIGS. 9 and 10). In this case, however, the brake $B_3$ is engaged, so that the carrier 34 of the rear planetary gear unit is prevented from rotating in both directions, whereby engine braking is effected.

Although embodiments have been described with reference to a longitudinal automatic transmission for rear-wheel drive vehicles having the sub-transmission unit 16 on the front side and the main transmission unit 21 on the rear side, this is not exclusive and the invention can equally be applied to a transverse type automatic transmission for front-wheel drive vehicles in which the main transmission unit is disposed on the front side while the sub-transmission having an under-drive planetary gear unit is disposed on the rear side.

The embodiments described hereinbefore offer the following advantages.

In the embodiment which employs the solenoid valve $S_D$ which operates under duty ratio control for controlling the control valve 66, it is possible to freely set the condition of the releasing operation of the frictional engagement element, e.g. the release pressure at which the slip is commenced in the element and the pressure in the transient period till the element is completely released. This permits a very delicate control of the operation characteristics in accordance with the speed changing characteristics of the automatic transmission and the running state of the automobile.

On the other hand, the embodiment which employs the solenoid valve $S_D'$ operative to control the control valve under on-off control permits the setting of the slip pressure in the frictional engagement element at a level corresponding to the torque, by using a simple and reliable arrangement.

The control valve 66 can be operated by the simple on-off control type solenoid valve $S_D'$. However, by applying a signal corresponding to the engine power, e.g. the throttle pressure, to the control valve 66 simultaneously with the signal from the solenoid valve $S_D'$, it is possible to commence the releasing operation of the frictional engagement element at a constant level, whereby the releasing operation of the frictional engagement element Bo is completed in synchronism with the completion of the shifting operation in the main transmission unit 21.

It is to be understood also that the following advantage is derived specifically when the invention is applied to a multi-speed automatic transmission of the type which has a main transmission unit combined with a sub-transmission unit both capable of outputting a plurality of speeds. Namely, in such an application, the shifting operations in both transmission units, particularly the downshift operation in the sub-transmission unit and the upshift operation in the main transmission unit, are synchronized so that the drastic deceleration or acceleration in the transient period of the shifting operation in the automatic transmission is avoided. Consequently, abrupt acceleration or deceleration, as well as impact, which may otherwise be caused as a result of such drastic deceleration or acceleration of the output shaft of the automatic transmission is prevented to ensure a smooth shifting operation of the automatic transmission.

In addition, if the arrangement is such that the control valve 66 is provided between the frictional engagement element, e.g. the brake Bo and the shift valve, e.g. the shift valve 53, for controlling the frictional engagement element, it is possible to avoid the risk of simultaneous engagement of the clutch Co and the brake Bo which may otherwise be caused due to a malfunction of the solenoid valve $S_D$ or due to sticking of the control valve 66. This arrangement, therefore provides a kind of fail-safe function of the automatic transmission.

In the described embodiment, the sub-transmission unit 16 is comprised of the overdrive planetary unit 17, while the main transmission unit 21 is comprised of the front planetary gear unit 21 and the rear planetary gear unit 20. This arrangement is basically the same as that of the known overdrive automatic transmission. Thus, according to the invention, a multi-speed automatic transmission can be produced at a low cost by making an efficient use of an existing production line without requiring a substantial change in the line arrangement.

The use of the modulator valve 65 which delivers the modulated pressure to the solenoid valve $S_D$ for controlling the control valve 66 offers an advantage in that the solenoid valve need not be subjected to high hydraulic pressure undergoing a large variation. This in turn permits the use of a compact solenoid valve $S_D$ and, at the same time, significantly improves the durability of the solenoid valve $S_D$. The levels of the hydraulic pressures applied to the control valve 66 also can be reduced to low levels corresponding to the modulated pressure.

Although the invention has been described through specific terms, it is to be noted here that the described embodiments are only illustrative, and various changes and modifications are possible without departing from the scope of the invention which is limited solely by the appended claims.

What is claimed is:

1. A hydraulic circuit for controlling an automatic transmission having a speed changing gear mechanism comprising operatively engageable and disengable parts, and a frictional engagement element for engaging and disengaging the parts of the speed changing gear mechanism, said hydraulic circuit comprising:
   a hydraulic servomotor for actuating said frictional engagement element;
   a shift valve for supplying said hydraulic servomotor with hydraulic fluid so that a servo pressure is established and for draining said hydraulic servomotor;
   a control valve operatively hydraulically connected between said shift valve and said hydraulic servomotor; and
   a duty-ratio controlled solenoid valve operatively connected to said control valve for controlling said control valve to cause the servo pressure of said hydraulic servomotor to be gradually reduced through said control valve before said hydraulic servomotor is drained through said shift valve through which shift valve said hydraulic servomotor is completely drained.

2. In an automatic transmission of the type having a sub-transmission unit and a main transmission unit in which paths through which power is transmitted in the respective transmission units are changeable to output different respective speeds, and frictional engagement elements for shifting the paths through which power is transmitted in the respective transmission units to attain a plurality of speeds through a combination of the different speeds output by the sub-transmission unit and the main transmission unit,
a hydraulic circuit for controlling the automatic transmission comprising:
hydraulic servomotors for controlling the frictional engagement elements;
shift valves for supplying and draining hydraulic fluid to and from said hydraulic servomotors to establish and reduce respective servo pressure therein;
a control valve disposed in a hydraulic oil passage hydraulically connected to the hydraulic servomotor of one of the frictional engagement elements in at least one of the sub-transmission unit and the main transmission unit;
a solenoid valve for controlling the hydraulic fluid flow through said control valve; and
a controlling means for activating said control valve through said solenoid valve so as to control the servo pressure acting in said hydraulic servomotor and actuate the frictional engagement element in an operational manner in which the shifting in both of the transmission units is synchronized.

3. A hydraulic circuit for controlling an automatic transmission as claimed in claim 2 and in which the frictional engagement element is an element in said sub-transmission unit, wherein said controlling means is for synchronizing a downshift in the sub-transmission unit and an upshift in the main transmission unit.

4. A hydraulic circuit for controlling an automatic transmission as claimed in claim 2, wherein said control valve is connected between the hydraulic servomotor of one of the frictional engagement elements and the shift valve for said hydraulic servomotor.

5. A hydraulic circuit for controlling an automatic transmission as claimed in claim 2 and in which the sub-transmission unit is an overdrive planetary gear unit while said main transmission unit includes a front planetary gear unit and a rear planetary gear unit, and the frictional engagement element is a brake of the overdrive planetary gear unit,
wherein said control valve is a brake release control valve for controlling pressure acting on said brake to release the brake.

6. A hydraulic circuit for controlling an automatic transmission as claimed in claim 2, wherein said controlling means comprises means for controlling the duty ratio of said solenoid valve for controlling said control valve.

7. A hydraulic circuit for controlling an automatic transmission as claimed in claim 2, wherein said controlling means comprises means fo reffecting on-off control of said solenoid valve for controlling said control valve.

8. A hydraulic circuit for controlling an automatic transmission as claimed in claim 2, and further comprising a signal application means for applying a signal to said control valve corresponding to the power of the engine, whereby a hydraulic pressure corresponding to the engine power is applied to the frictional engagement element.

9. A hydraulic circuit for controlling an automatic transmission as claimed in claim 8, wherein said signal application means includes a throttle valve.

10. A hydraulic circuit for controlling an automatic transmission as claimed in claim 2, and further comprising a pressure modulator valve for modulating the pressure of hydraulic fluid and a modulated pressure supplying means for supplying said fluid, the pressure of which is modulated by said pressure modulator valve, to said solenoid valve for controlling said control valve.

* * * * *